United States Patent
Shiraishi

[11] Patent Number: 5,957,996
[45] Date of Patent: Sep. 28, 1999

[54] DIGITAL DATA COMPARATOR AND MICROPROCESSOR

[75] Inventor: Mikio Shiraishi, Kanagawa-ken, Japan

[73] Assignee: Kabushiki Kaisha Toshiba, Kawasaki, Japan

[21] Appl. No.: 08/982,299

[22] Filed: Dec. 1, 1997

[30] Foreign Application Priority Data

Nov. 29, 1996 [JP] Japan ................................ 8-319655

[51] Int. Cl.⁶ ................................ G06F 7/00; G06F 7/50
[52] U.S. Cl. ................................ 708/201; 708/671
[58] Field of Search ................................ 708/200, 201, 708/760, 761, 700, 207, 202; 340/146.2

[56] References Cited

U.S. PATENT DOCUMENTS

| | | | |
|---|---|---|---|
| 4,648,059 | 3/1987 | Gregorcyk | 708/671 |
| 4,761,759 | 8/1988 | Nakagawa | 708/671 |
| 5,148,386 | 9/1992 | Hori | 708/670 |
| 5,412,588 | 5/1995 | Shiraishi | 364/721 |
| 5,793,655 | 8/1998 | Harlap et al. | 708/201 |

*Primary Examiner*—Chuong Dinh Ngo
*Attorney, Agent, or Firm*—Banner & Witcoff, Ltd.

[57] ABSTRACT

The present invention provides a digital data comparator having a first selective data inverting circuit inverting a first input data when the sign of the first input data is negative, or outputting the first input data when the sign is positive, a first adding circuit coupled to an output of the first selective data inverting circuit, adding one to the least significant bit when the sign of the first input data is negative, or outputting the first input data when the sign is positive, a second selective data inverting circuit inverting a second input data when the sign of the second input data is positive, or outputting the second input data when the sign is negative, and a second adding circuit adding an output of the first adding circuit and an output of the second selective data inverting circuit.

26 Claims, 5 Drawing Sheets

$$c' = \begin{cases} p \ (s = 0) \\ q \ (s = 1) \end{cases}$$

| INPUTS | | | OUTPUT |
|---|---|---|---|
| s | p | q | c' |
| 0 | 0 | 0 | 0 |
| 0 | 0 | 1 | 0 |
| 0 | 1 | 0 | 1 |
| 0 | 1 | 1 | 1 |
| 1 | 0 | 0 | 0 |
| 1 | 0 | 1 | 1 |
| 1 | 1 | 0 | 0 |
| 1 | 1 | 1 | 1 |

DIGITAL DATA COMPARATOR AND MICROPROCESSOR

BACKGROUND OF THE INVENTION

1. Field of the Invention

The present invention relates to a digital data comparing circuit for a digital signal, more particularly to a digital data comparing circuit used for a microprocessor and a digital signal processor (hereinafter referred to as a DSP).

2. Description of the Related Art

When magnitudes of two data are compared, absolutes values of the two data are sometimes compared in case where the two data have different algebraic signs. For example, such comparison processing is needed at the time of peak detection of voice data.

In general, as a representation style of sign-bearing data, a notation has been adopted using a two's complement. In order to obtain an absolute value of data represented by the style of the two's complement, the total data must be first logically inverted in response to a sign bit of the data. Thereafter, a number "1" must be added to the least significant bit (LSB). Specifically, if the data is a negative number, its two's complement becomes an absolute value, and the two's complement can be obtained by adding the number "1" to one's complement. Therefore, the total of the data is logically inverted and the number "1" is added to the least significant bit of this logically inverted data. If the data is a positive number, a value of the data becomes an absolute value. As a result, in order to make a comparison for the absolute values, an adder must be prepared in addition to an operation circuit for making the comparison.

Therefore, in order to make a comparison for the absolute values of the numbers represented according a notation of the two's complement style, a method in which absolute values of all of the data are previously computed and the values of the absolute values are subsequently compared is employed. Or, a method in which comparison for the absolute values of all of the data are made while computing the absolute values of all of the data is also employed.

FIG. 1 shows a conventional example of an absolute value comparing circuit for simultaneously executing both of computation of an absolute value and a comparison operation. Hereinafter, the same symbols are given to the same components and descriptions for them are omitted. Referring FIG. 1, reference symbols X and Y denote data of multi bits represented according to the notation of the two's complement style. Moreover, sign bits of the data X and Y, that is, the most significant bits (MSB), shall be represented by "a" and "b", respectively.

A circuit for obtaining an absolute value U of the data X consists of an selective inverter 2a and an incrementer 3a. The data X is supplied to a data input terminal of the selective data inverter 2a, and the signal a is supplied to a control terminal thereof. The data selective inverter 2a inverts the data X to output as data X', if the data is a negative number, that is, if the signal "a" is high in a logic level. When the data X is a positive number, that is, if the signal "a" is low in the logic level, the inverter 2a outputs the as-received data X as the data X' without inverting it.

The incrementer 3a comprises a data input terminal and a control terminal, and the data input terminal thereof is supplied with the data X' and the control terminal thereof is supplied with the signal "a". If the data X is a negative number, that is, the signal "a" is high in the logic level, the incrementer 3a adds a number "1" to the least significant bit of the data, and outputs it as data U. When the data is a positive number, that is, the signal "a" is low in the logical level, the incremeter 3a outputs the as-received data X' as the data U without adding the number "1" to the least significant bit of the data X'.

Similarly, a circuit for obtaining an absolute value V of data Y consists of a selective data inverter 2b and an incrementer 3b. Both of the data U and V are supplied to input terminals of a magnitude comparator 1, respectively. The magnitude comparator 1 compares the data U and V, and outputs the comparison result as a flag SF. The flag SF takes the value represented by means of SF=0 when U≧V is satisfied, and takes the value represented by means of SF=1 when U<V is satisfied.

FIG. 2 shows a circuit example of the selective data inverter 2a. This circuit is for a data width of four bits. X3 to x0 show from the most significant bit to the least significant bit of the data X in this order. x'3 to x'0 show from the most significant bit to the least significant bit of the data X' in this order.

As is shown in FIG. 2, each of first input terminals of exclusive OR gates 4a to 4d is supplied with a most significant bit data a, and each of second input terminals or the exclusive OR gates 4a to 4d is supplied with x3 to x0. Output terminals of the exclusive OR gates 4a to 4d output x3' to x0' as output signals, respectively.

The selective data inverter 2b has the same constitution as that of the selective data inverter 2a shown in FIG. 2.

FIG. 3 shows an example of a circuit constitution of the incrementer 3a shown in FIG. 1. The circuit of the incrementer 3a is for a data width of four bits. Referring to FIG. 3, reference symbols 5a to 5d denote exclusive OR gates, respectively, and reference symbols 6a to 6c denote AND gates, respectively. Furthermore, reference symbols u3 to u0 denote from the most significant bit to the least significant bit of the data U in this order.

As is shown in FIG. 3, the signal a is supplied to first input terminals of the exclusive OR gate 5a and the AND gate 6c, and the signal x0' is supplied to second input terminals thereof. An output terminal or the AND gate 6c is connected to respective first input terminals of the exclusive OR gate 5c and the AND gate 6b, and the signal x1' is supplied to respective second input terminals thereof. An output terminal of the AND gate 6b is connected to respective first input terminals of the exclusive OR gate 5b and the AND gate 6a, and the signal x2' is supplied to respective second input terminals thereof. A first input terminal of the exclusive OR gate 5a is connected to an output terminal of the AND gate 6a, and a second input terminal of the exclusive OR gate 5a is supplied with the signal x3'. Moreover, output signals from the exclusive OR gates 5a to 5d are u3 to u0, respectively.

The incrementer 3b also has the same circuit constitution as that of the incrementer 3a shown in FIG. 3.

FIG. 4 shows an example of a circuit constitution of the magnitude comparator 1 shown in FIG. 1. This circuit of the magnitude comparator 1 is for a data width of four bits.

Referring to FIG. 4, reference symbols 7a to 7d denotes inverters; 8a to 8c, exclusive NOR gates; 9a to 9d, AND gates; and 10, an OR gate. Moreover, reference symbols V3 to V0 denote from the most significant bits to the least significant bits in this order.

An operation of the absolute value comparing circuit shown in FIG. 1 will be described below. First, the data X and Y to be compared, which are represented according to the notation in the two's complement style, are input to the conventional absolute value comparing circuit.

Next, when the data X and Y indicate negative numbers, that is, when the sign bits a and b or the data X and Y are high in a logic level, the selective data inverters 2a and 2b inverts all bits of the data X and Y and output the inverted data. When the data X and Y indicate positive numbers, that is, when the sign bits a and b of the data X and Y are low in the logic level, the selective data inverters 2a and 2b output the as-received input data X and Y without inverting them.

Thereafter, when the sign signals a and b are high in a logic level, the signals a and b are added to the least significant bit of the data output from the selective data inverter 2 by means of the incrementers 3a and 3b, respectively. On the other hand, the sign signals a and b are low in level, the as-received data X' and Y' are output as the data U and V. As described above, the absolute values U and V of the binary numbers X and Y represented according to the notation of the two's complement style are computed.

The absolute values |X| and |Y| computed in the above described manner are subjected to a judgment for their magnitude relation between them by means of a non-sign magnitude comparator 1. As a result of the judgment, when $|X|<|Y|$ is satisfied, the flag SF equal to one is output from the magnitude comparator 1, when $|X|\geq|Y|$ is satisfied, the flag SF equal to zero 0 is output therefrom.

However, the foregoing conventional absolute value comparing circuit has a disadvantage in that it has a comparatively large circuit scale. For this reason, the conventional absolute value comparing circuit has never been built in a microprocessor. In order to compare the absolute values of the data X and Y using the microprocessor in which the absolute value comparing circuit is not built-in, there are the following two ways.

The first way is the one in which the absolute values of the data X and Y are compared after computations for the absolute values of them. Since this way requires memory areas for storing the absolute values of the data X and Y, a large number of memory areas are occupied when a large number of the data X and Y exist like time variant sequential data. Moreover, the first way has a disadvantage in that the comparisons for the absolute values of data X and Y can not be performed until the computations for all of the absolute values of the data X and Y are completed.

The second way is the one in which comparisons for the absolute values of the data X and Y are performed every time of computation for the absolute values of them. In this way, though the memory areas are never occupied because of computations of the absolute values of the data X and Y, an operation time equivalent to one machine cycle is needed for the computation for the absolute value |X| of the data X, an operation time equivalent to one machine cycle is needed for the computation for the absolute value |Y| of the data Y, and an operation time equivalent to one machine cycle is needed for the comparison for both of the absolute values |X| and |Y|. Therefore, the comparison results can be obtained every three machine cycles. This implies that an operation time three times as long as that of the case where the foregoing absolute comparing circuit is built in the microprocessor is needed. A longer time than that operation time is actually consumed because of transferring of the data and the like.

SUMMARY OF THE INVENTION

The present invention was made from the above described viewpoint, and the object of the present invention is to provide an absolute value comparing circuit of a digital signal capable of reducing the number of hardware for directly comparing absolute values of data and shortening a processing time.

To achieve the above object, the present invention provides a digital data comparator comprising a first selective data inverting means inverting a first input data when the sign of the first input data is negative, or outputting the first input data when the sign is positive, a first adding means coupled to an output of the first selective data inverting means, adding one to the least significant bit when the sign of the first input data is negative, or outputting the first input data when the sign is positive, a second selective data inverting means inverting a second input data when the sign of the second input data is positive, or outputting the second input data when the sign is negative, and a second adding means adding an output of the first adding means and an output of the second selective data inverting means.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

A more complete appreciation of the present invention and many of its attendant advantages will be readily obtained by reference to the following detailed description considered in connection with the accompanying drawings, in which.

DETAILED DESCRIPTION OF PREFERRED EMBODIMENTS

Embodiments of the present invention will be described in detail with reference to the drawings.

Figure 5:
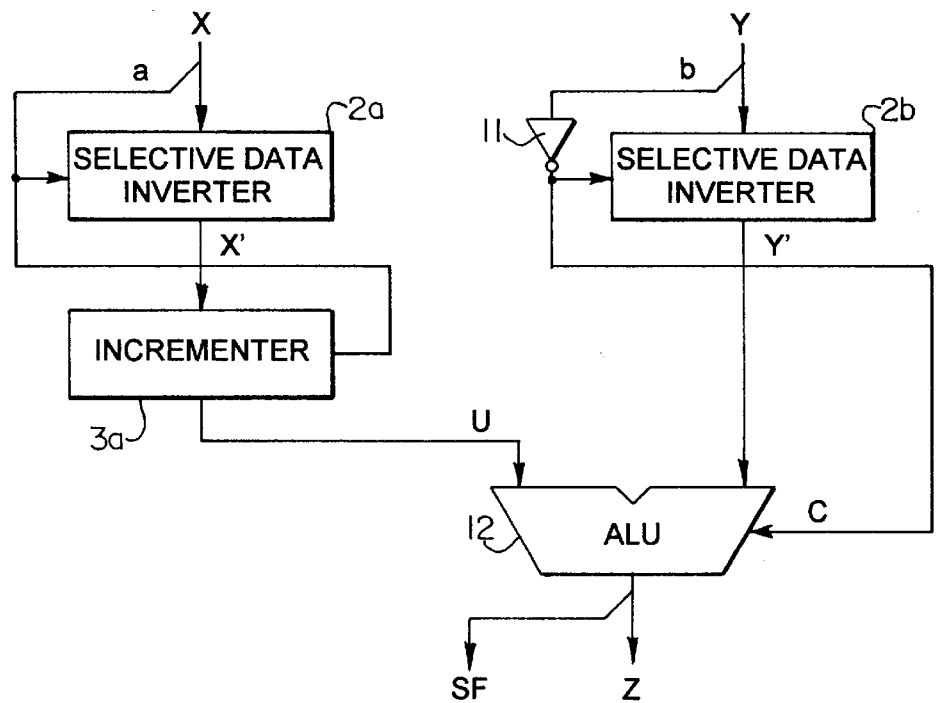
FIG. 5 is a circuit diagram of a first embodiment.

FIG. 5 shows a first embodiment of the present invention. Reference symbols X and Y denote binary data of a plurality of bits represented according to a notation of two's complements style, respectively. Moreover, sign bits of the data X and Y, that is, the most significant bits (MSB) of the data X and Y, are denoted by symbol a and b, respectively. When a and b are high ("1") in level, the data X and Y shall be negative numbers. When a and b are low ("0") in level, the data X and Y shall be positive numbers.

Figure 2:
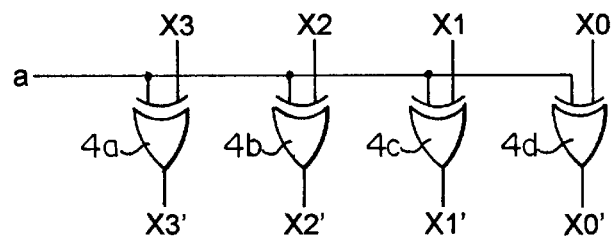
FIG. 2 is a circuit diagram of a selective data inverter shown in FIG. 1.

Referring to FIG. 5, a selective data inverter 2a comprises a data input terminal and a control terminal. The data X is supplied to the data input terminal of the selective data inverter 2a, and the signal a is supplied to the control terminal thereof. The selective data inverter 2a has the same circuit structure as that of, for example, the conventional selective data inverter shown in FIG. 2. When the data X is a negative number, that is, when the signal a is high in level, the selective data inverter 2a inverts the data X to output data X'. When the data X is a positive number, that is, when the signal a is low in level, the selective data inverter 2a outputs the as-received data X as the data X'.

Figure 3:
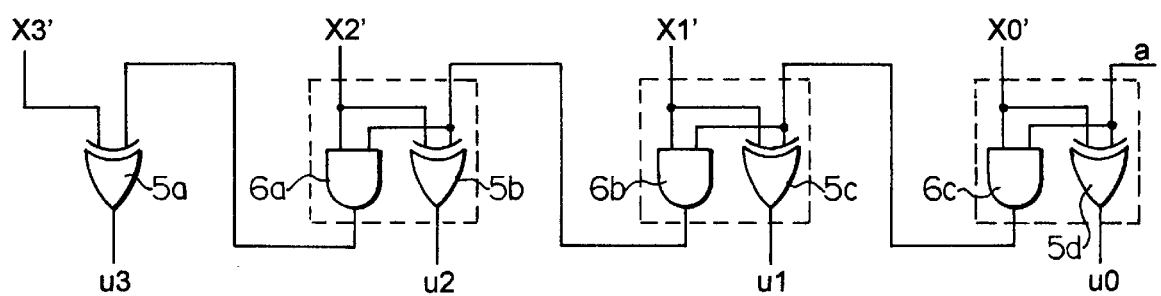
FIG. 3 is a circuit diagram of an incremeter shown in FIG. 1.
Figure 4:
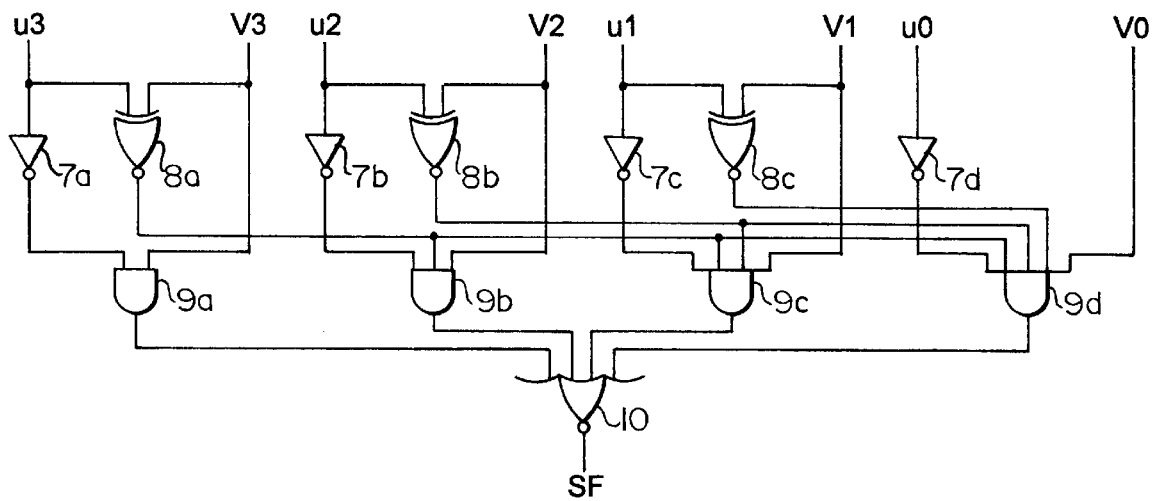
FIG. 4 is a circuit diagram of the magnitude comparator shown in FIG. 1.

Moreover, an incrementer 3a comprises a data input terminal and a control terminal. The data X' is supplied to the data input terminal of the incrementer 3a and the signal a is supplied to the control terminal thereof. The incrementer 3a has the same circuit structure as that of, for example, the conventional incrementer shown in FIG. 3. When the data X is a negative number, that is, when the signal a is high in level, the incrementer 3a adds the number "1" to the least significant bit of the data X', and outputs it as data U. When the data X is a positive number, that is, when the signal a is low in level, the incrementer outputs the as-received data X' as the data U. This output data U indicates an absolute value |X| of the data X.

Moreover, as shown in FIG. 5, the data Y is supplied to an input terminal of a selective data inverter 2b. The signal b is supplied to an input terminal of an inverter 11, and an output terminal of the inverter 11 is connected to a control terminal of the selective data inverter 2b. The selective data inverter 2b has the same circuit structure as that of, for example, the conventional selective data inverter shown in FIG. 2. When the data X is a positive number, that is, when, the signal b is low in level, the selective data inverter 2b inverts the data Y and outputs the inverted data /Y as data Y' (hereinafter symbol "/" shall indicate an inverted signal). When the data X is a negative number, that is, when the signal b is high in level, the selective data inverter 2b outputs the as-received data Y as the data Y'.

The data U and Y' are supplied to first and second data input terminals of an Arithmetic Logic Unit (hereinafter referred to as A1U) 12 capable of performing additions with a carry signal. Moreover, an output signal c of the inverter 11 is supplied to a carry input terminal of the ALU 12.

Figure 6:
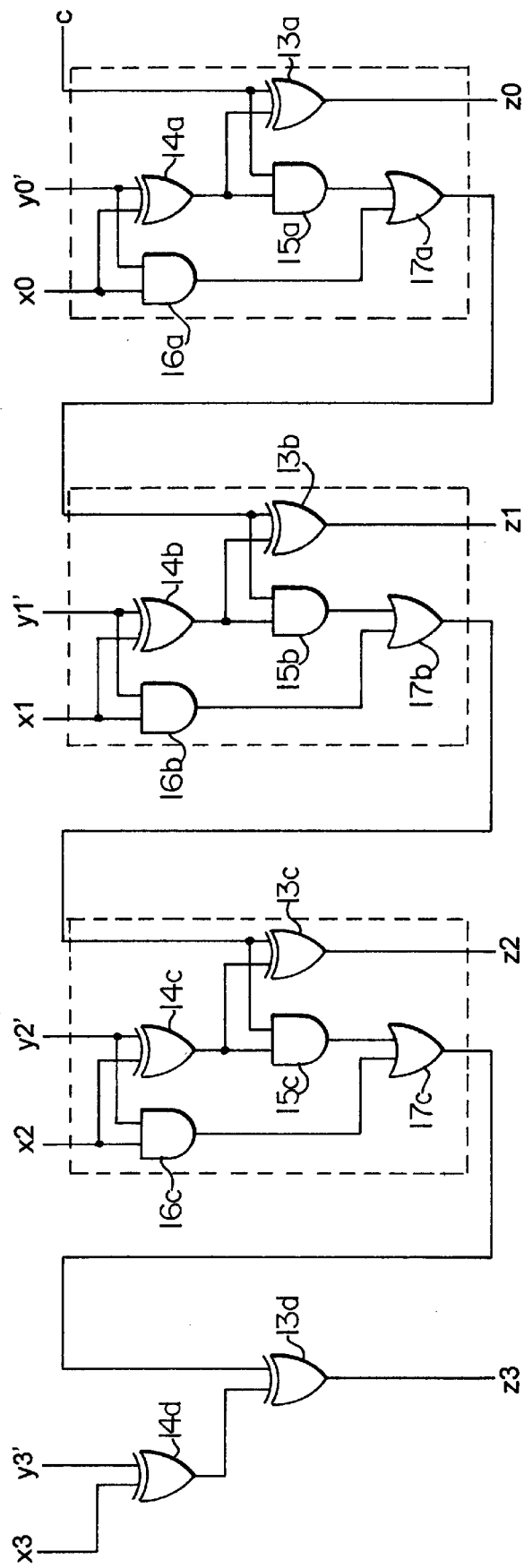
FIG. 6 is a circuit diagram of the arithmetic logic unit.

FIG. 6 shows an example of a circuit diagram of the ALU 12. The date X and Y' have a data structure of four bits, and reference symbols x3 to x0, y3' to y0' and z3 to z0 sequentially denote signals from the most significant bit to the least significant bit of the data X, Y' and Z, respectively.

The signals x0 to x3 are supplied to first input terminals of exclusive OR gates 14a to 14d, respectively, and the signals y0' to y3' are supplied to second input terminals of the exclusive OR gates 14a to 14d, respectively.

Moreover, the signals x0 to x2 are supplied to first input terminals of AND gates 16a to 16c, respectively, and the signals y0' to y2' are supplied to second input terminals of AND gates 16a to 16c, respectively.

Each of output terminals of the exclusive OR gates 14a to 14c is connected to corresponding one of first input terminals of exclusive OR gates 13a to 13c and corresponding one of first input terminals of AND gates 15a to 15c. An output terminal of the exclusive OR gate 14d is connected to a first input terminal of an exclusive OR gate 13d. Each of output terminals of the AND gates 15a to 15c is connected to corresponding one of first input terminals of OR gates 17a to 17c, and each of output terminals of AND gates 16a to 16c is connected to corresponding one of second input terminals of the OR gates 17a to 17c.

Furthermore, the signal c is supplied to a second input terminal of the exclusive OR gate 13a, and each of second input terminals of the exclusive OR gates 13b to 13d is connected to corresponding one of output terminals of the OR gates 17a to 17c.

Output signals of the exclusive OR gates 13a to 13d are the signals z0 to z3, respectively.

Therefore, in FIG. 6, each of the portions located within dotted lines constitutes a full adder, and each of the output terminals of the OR gates 17a to 17c is for transferring a carry digit.

Next, an operation of the first embodiment of the present invention shown in FIG. 5 will be described. First of all, an absolute value comparing method in the first embodiment of the present invention will be described. Absolute values of the binary data X and Y of a plurality of bits represented according to a notation in a two's complement style shall be represented by |X| and |Y|, and the following operation shall be performed.

$$Z=|X|-|Y| \qquad (1)$$

the results of the operation are as follows.

If Z<0 is satisfied, |X|<|Y| is obtained,
if Z=0 is satisfied, |X|=|Y| is obtained,
and
if Z>0 is satisfied, |X|>|Y| is obtained.
Therefore, the sign bit of the data X is equal to the signal SF in the prior art, and the comparison results for the absolute values can be represented by the sign bit of the data Z. Specifically, if |X|<|Y| is satisfied, SF=1 is established, and
if |X|≧|Y| is satisfied, SF=0 is established.
Here, the equation (1) is changed to the following equation (3).

$$Z=|X|+(-|Y|) \qquad (3)$$

Therefore, when a minus sign is given to the absolute values of the data X and Y and the values given with the minus sign are added, the comparison for the absolute values can be conducted.

In this embodiment, the operation of the above equation (3) is performed with respect to the input data X and Y and then the data Z is output. Specifically, when the sign bit a of the input data X is "1" (high level), the data X is inverted by the selective data inverter 2a, and only one is added to the inversion result by the incrementer 3a, thereby outputting the addition result as the data U. When the sign bit a of the input data X is "0" (low level), the as-received data X is output as the data U.

Moreover, when the eign bit b of the input data Y is "0" (low level), the data Y is inverted by the selective data inverter 2b, and the data /Y is output as the data Y'. When the sign bit b of the input data Y is "1" (high level), the as-received data Y is output as the data Y'.

The ALU 12 performs additions for the output data U of the incrementer 3a, the output data Y' of the selective data inverter 2b and the inverted signal c of the sign bit b, thereby outputting the data Z.

Specifically, ① when the data Y indicates a positive number, the inverted signal of the sign bit b is "1" (high level) so that the output data Z of the ALU 12 is as follows.

$$Z=|X|+/Y+1$$

This is rewritten according to the notation of the two's complement style as follows.

$$-Y=/Y+$$

Therefore, the equation $$Z=|X|-Y=|X|-|Y|$$

can be obtained.

② When the data Y indicates a negative number, the inverted signal of the sign bit b is "0" (low level), the output data Z of the ALU 12 is as follows.

$$Z=|X|+Y=|X|-|Y|$$

As described above, the equation $$Z=|X|-|Y|$$

is established regardless of the sign of the data Y, so that the relation of the equation (1) is established.

Therefore, the comparison result of the absolute values X and Y, which is shown in the equation (2), can be known by the sign bit that is the most significant bit of the data Z.

Figure 1:
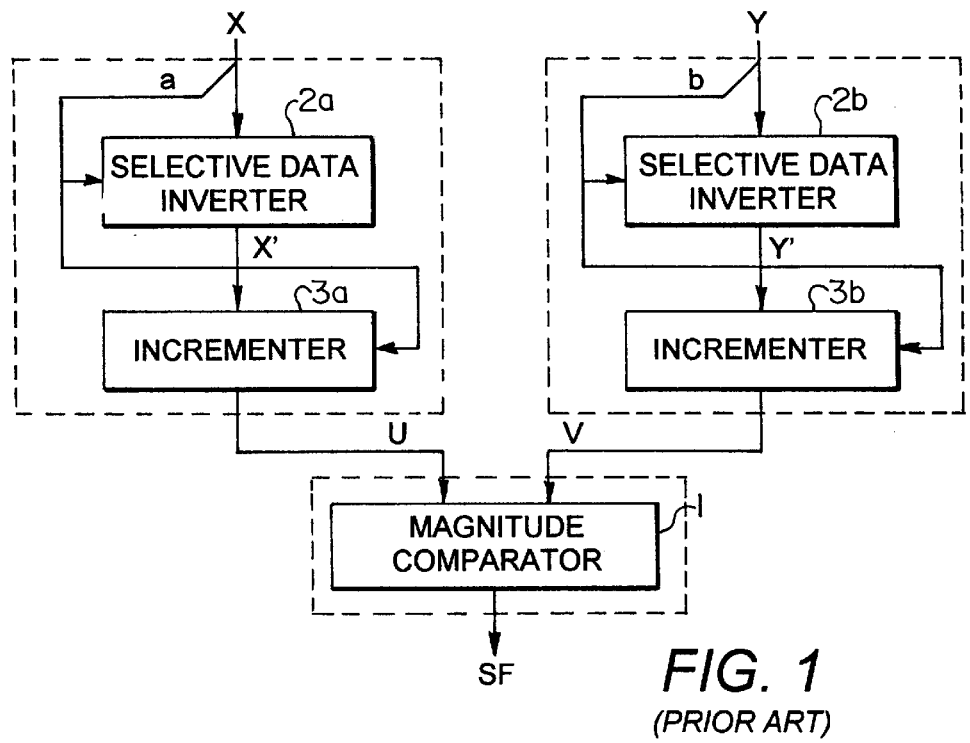
FIG. 1 shows a conventional digital data comparator.

Compared to the circuit shown in FIG. 1 which realizes the conventional method in which the absolute values of the data are previously computed and then they are compared, in the circuit of this embodiment shown in FIG. 5, an occupied area of the circuit can be reduced to ⅔ of that shown in FIG. 1. Moreover, in a microprocessor in which the circuit of this embodiment is not built-in, one machine cycle is needed for each instruction, such as "obtain an absolute value of one data", "obtain an absolute value of the other data" and "compare the data" Therefore, three machine cycles in total are needed. On the other hand, in the microprocessor in which the circuit of the present invention is built-in, the comparison of the absolute values of the data can be performed within one machine cycle as is described above. For this reason, the microprocessor using the present invention has an ability to increase an operation speed to three times as high as that of the conventional microprocessor.

Figure 7:
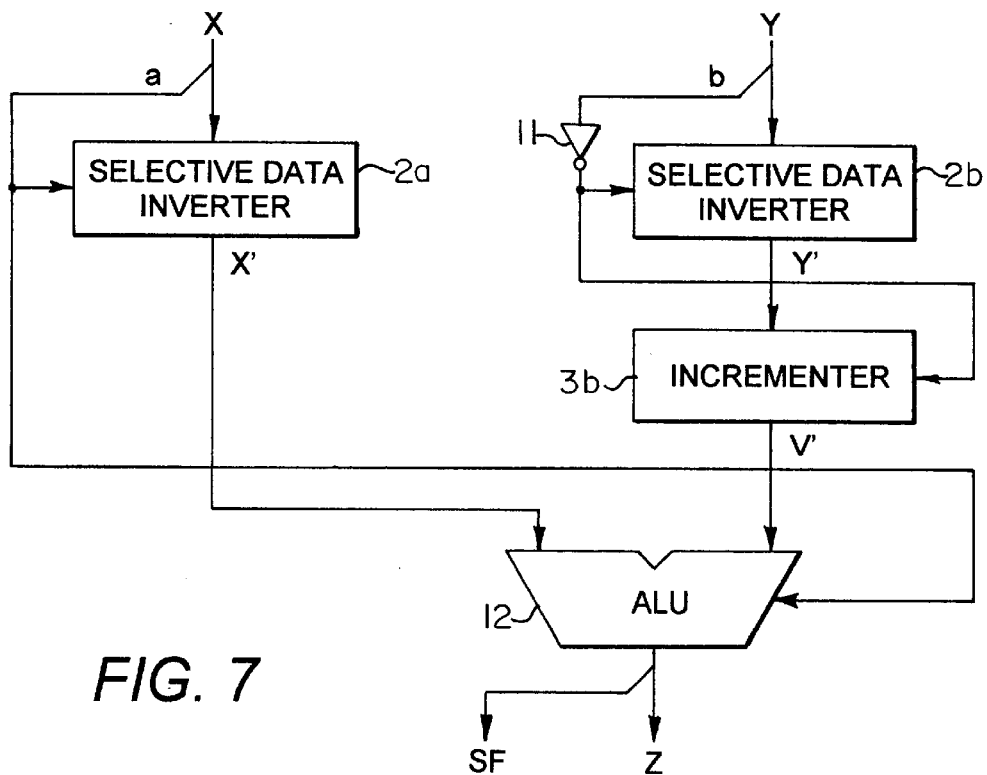
FIG. 7 is a circuit diagram of a second embodiment.

FIG. 7 shows a second embodiment of the absolute value comparing circuit of the present invention. Referring to FIG. 7, a selective data inverter 2a comprises a data input terminal and a control terminal. Data X is supplied to the data input terminal of the selective data inverter 2a, and a signal a is supplied to the control terminal thereof.

Data Y is supplied to a data input terminal of a selective data inverter 2b. A signal b is supplied to an input terminal of an inverter 11, and an output terminal of the inverter 11 is connected to a control terminal of the selective data inverter 2b.

An incrementer 3b comprises a data input terminal and a control terminal. Output data Y' of the selective data inverter 2b is supplied to the incrementer 3b. The control terminal of the incrementer 3b is connected to an output terminal of the inverter 11. The incrementer 3b has the circuit structure shown in FIG. 3, for example.

Output data X' of the selective data inverter 2a is supplied to a first data input terminal of an ALU 12, and output data V' of the incrementer 3b is supplied to a second data input terminal of the ALU 12. The signal a is supplied to a carry input terminal of the ALU 12. The ALU 12 outputs an operation result as data Z.

The circuit shown in FIG. 7 executes an operation expressed by the equation $$Z=|X|-|Y|.$$

Therefore, comparison results of the absolute values of the data X and Y can be known from the sign flag SF of the data Z, similar to the embodiment shown in FIG. 5.

① In case where X≧0 and Y≧0 are satisfied, the signals a and b are "0" (low level), therefore, the data X' is equal to the data X. The data Y is inverted by the selective data inverter 2b and one is added to the least significant bit in the incrementer 3b. Therefore, V'=/Y+1=-Y are established. Since the carry input signal a input to the ALU 12 is "0" (low level), $$Z=X-Y+0=X-Y$$

is established.

② In case where X≧0 and Y<0 are satisfied, the signals a is "0" (low level) and the signal b is "1" (high level), therefore, the data X' is equal to the data X. The data Y becomes equal to the data V'. Since the carry input signal a input to the ALU 12 is "0" (low level), $$Z=X+Y=X-|Y|$$

are established.

③ In case where X<0 and Y≧0 are satisfied, the signal a is "1" (high level) and the signal b is "0" (low level) so that the data X' is equal to the data /X. The data Y is inverted by the selective data inverter 2b, and one is added to the least significant bit in the incrementer 3b. Therefore, $$V'=/Y+1=-Y$$

are established. Since the carry input signal a input to the ALU 12 is "1" (high level), $$Z=/X+1-Y=-X-Y=|X|-Y$$

are established.

④ In case where X<0 and Y<0 are satisfied, the signal a and b are "1" (high level). Therefore, the data X' is equal to the data /X. The data Y becomes equal to the data V'. Since the carry input signal a input to the ALU 12 is "1" (high level), $$Z=/X+1+Y=|X|-|Y|$$

are established.
Therefore, $$Z=|X|-|Y|$$

is established, regardless of the sign of the data X. In this embodiment, the same effects as those of the embodiment shown in FIG. 5 can be obtained. Moreover, since the adder is always provided in an ALU such as a CPU and a DSP, the adder can be shared by adding a small number of gates, whereby the absolute value comparing circuit can be built in the CPU and the DSP.

Moreover, in the foregoing embodiments, when an ALU capable of performing subtractions is built in a CPU, a selective data inverter is also provided in the CPU. Therefore, if the ALU and the CPU share the adder and the selective data inverter, the absolute value comparing circuit can be realized only by incorporating a circuit foxed of a smaller number of gates therein.

Figure 8:
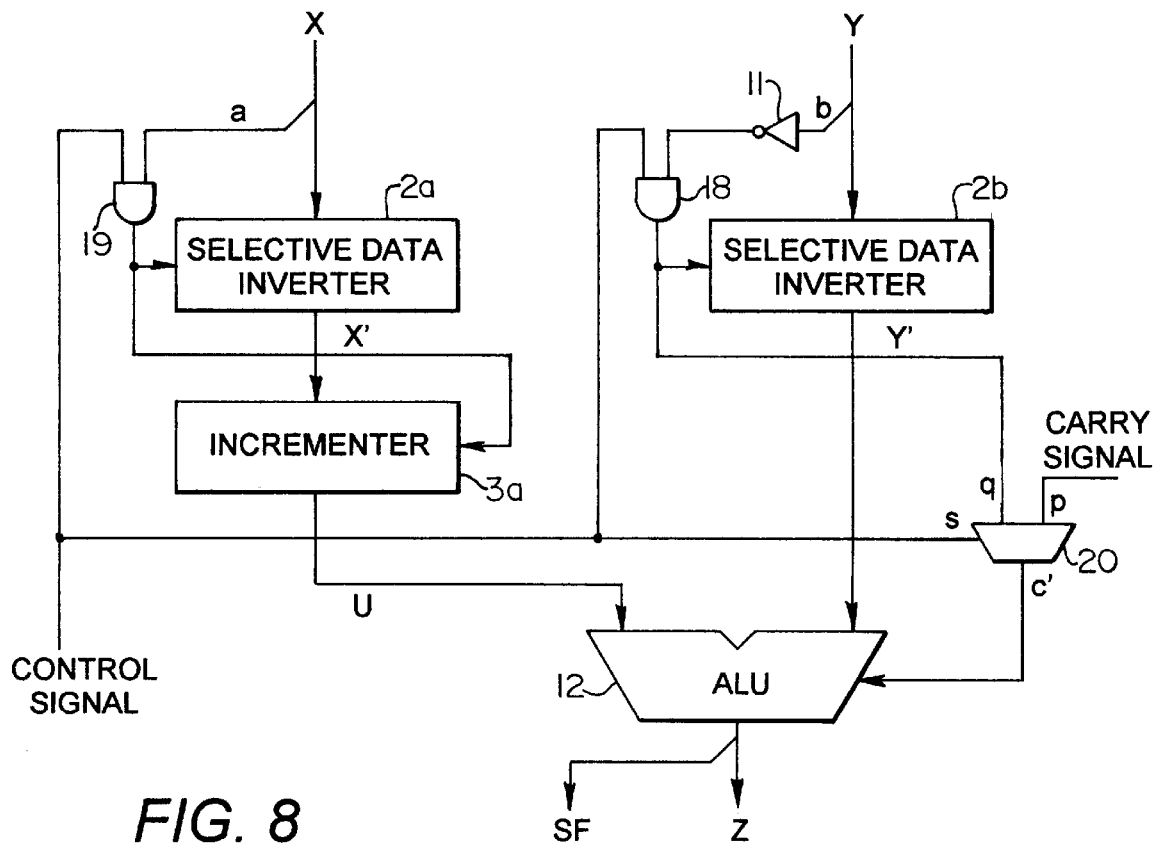
FIG. 8 is a circuit diagram of a third embodiment.

FIG. 8 shows an embodiment of the present invention, in which an adder is in an ALU capable of performing additions with carry. The circuit shown in FIG. 8 is constituted by adding AND gates 18 and 19 and a multiplexer 20 to the circuit shown in FIG. 5. The AND gate 18 comprises first and second input terminals and an output terminal. The first input terminal of the AND gate 18 is connected to the output terminal of the inverter 11. The second input terminal of the AND gate 18 is supplied with a control signal. The output terminal of the AND gate 18 is connected to the control terminal of the selective data inverter 2b. The multiplexer 20 comprises first and second input terminals, an output terminal, and a control terminal. The first terminal (q) of the multiplexer 20 is connected to the output terminal of the AND gate 18. The second terminal (p) of the multiplexer 20 is supplied, for example, with the carry signal. The control terminal (s) of the multiplexer 20 is supplied with a control signal. The output terminal (c') of the multiplexer 20 is connected to the carry signal input terminal of the ALU 12. Moreover, the signal a is supplied to a first input terminal or the AND gate 19. The control signal is supplied to a second input terminal of the AND gate 19. An output terminal of the AND gate 19 is connected to the control terminal of the selective data inverter 2a and the control terminal of the incrementer 3a.

Figures 9A, 9B:
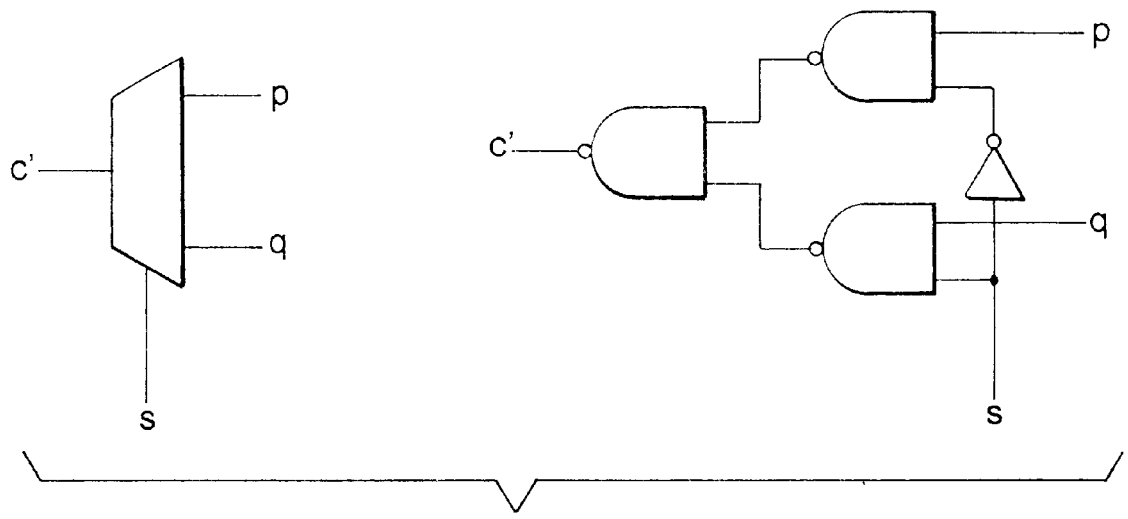
FIGS. 9A and 9B is a circuit diagram of the multiplexer shown in FIG. 8 and a table of truth value of the multiplexer.

FIGS. 9(a) and 9(b) are a circuit diagram of the multiplexer 20 of FIG. 8 and a truth table thereof.

In this embodiment, when the control signal is low in level, a signal in low level is supplied to the control terminals of the selective data inverters 2a and 2b and the control terminal of the incrementer 3a. As is shown in the truth table of FIG. 9(b), the multiplexer 20 outputs the carry signal as the output signal of the multiplexer 20 to be input to the carry input terminal of the ALU 12. The data X and Y are not change passing through the selective data inverters 2a and 2b, and the incrementer 3a when the output signal of AND gates 2a, and 2b are in low level. Therefore the data U and Y' correspond to the data X and Y, respectively, and a signal is supplied as the carry signal for the ALU 12. As a result, the operation result will be Z=X+Y+(carry signal).

On the other hand, when the control signal is high in level, the signal a is supplied to the control terminal of the selective data inverter 2a and the control terminal of the incrementer 3a as the output signal of the AND gate 19. Also, the a signal /b is supplied to the control terminal of the selective data inverter 2b as the output signal of the AND gate 18. The multiplexer 20 outputs /b input from the first input terminal, as is shown in the truth table of FIG. 9(b). Therefore, this circuit operates similar to the embodiment shown in FIG. 5. An operation result will be Z=|X|−|Y|.

Thus, in this embodiment, only by adding the selective data inverter 2a, the incrementer 3a, the inverter 11, the AND gates 19 and 19 and the multiplexer 20 to the ALU 12 capable of performing the addition with carry, the absolute value comparing circuit can be constituted.

As described above, according to the present invention, since the computation and the comparison for the absolute values are simultaneously performed, an operation time can be reduced, compared to the method in which the absolute values are previously computed and then the comparison for them are performed. Moreover, according to the present invention, the circuit of the present invention is built in the CPU and the DSP and the adders thereof are utilized when the comparison for the absolute values is performed, whereby the quantity of hardware can be reduced.

While there has been illustrated and described what are presently considered to be preferred embodiments of the present invention, it will be understood by those skilled in the art that various changes and modifications may be made, and equivalents may be substituted for devices thereof without departing from the true scope of the invention. In addition many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

what is claimed is:

1. A digital data comparator comprising:
   a first selective data inverting means inverting a first input data when the sign of the first input data is negative, or outputting the first input data when the sign is positive;
   a first adding means coupled to an output or the first selective data inverting means, adding one to the least significant bit when the sign of the first input data is negative, or outputting the first input data when the sign is positive;
   a second selective data inverting means inverting a second input data when the sign of the second input data is positive, or outputting the second input data when the sign is negative; and
   a second adding means adding an output of the first adding means and an output of the second selective data inverting means.

2. The digital data comparator according to claim 1, wherein the first and second selective data inverting means comprise a plurality of exclusive OR gate inputted the sign bit of the first input data to one input thereof, and inputted each bit of the first input data to another input thereof.

3. The digital data comparator according to claim 1, wherein the first adding means comprises a plurality of half-adder.

4. The digital data comparator according to claim 1, wherein the second adding means comprises a plurality of full-adder.

5. The digital data comparator according to claim 1, wherein the second adding means is comprised in an arithmetic logic unit.

6. The digital data comparator according to claim 1, further comprising:
   a first select means providing the sign bit of the first input data to the first selective data inverting means and the first adding means;
   a second select means providing an inverted signal of the sign bit of the second input data to the second selective data inverting means; and
   a third select means providing a carry signal or the inverted signal to the second adding means.

7. The digital data comparator according to claim 6, wherein the first and second selective data inverting means comprise a plurality of exclusive OR gate inputted the sign bit of the first input data to one input thereof, and inputted each bit of the first input data to another input thereof.

8. The digital data comparator according to claim 6, wherein the first adding means comprises a plurality of half-adder.

9. The digital data comparator according to claim 6, wherein the second adding means comprises a plurality of full-adder.

10. The digital date comparator according to claim 6, wherein the second adding means is comprised in an arithmetic logic unit.

11. The digital data comparator according to claim 6, wherein the first select means and the second select means comprise AND gate.

12. The digital data comparator according to claim 6, wherein the third select means comprises a multiplexer.

13. A digital data comparator comprising:
a first selective data inverting means inverting a first input data when the sign of the first input data is negative, or outputting the first input data when the sign is positive;
a second selective data inverting means inverting a second input data when the sign of the second input data is positive, or outputting the second input data when the sign is negative;
a first adding means coupled to an output of the second selective data inverting means, adding one to the least significant bit when the sign of the second input data is positive, or outputting the second input data when the sign is negative; and
a second adding means adding an output of the first adding means and an output of the first selective data inverting means.

14. The digital data comparator according to claim 13, wherein the first and second selective data inverting means comprise a plurality of exclusive OR gate inputted the sign bit of the first input data to one input thereof, and inputted each bit of the first input data to another input thereof.

15. The digital data comparator according to claim 13, wherein the first adding means comprises a plurality of half-adder.

16. The digital data comparator according to claim 13, wherein the second adding means comprises a plurality of full-adder.

17. The digital data comparator according to claim 13, wherein the second adding means is comprised in an arithmetic logic unit.

18. The digital data comparator according to claim 13, further comprising:
a first select means providing the sign bit of the first input data to the first selective data inverting means;
a second select means providing an inverted signal of the sign bit of the second input data to the second selective data inverting means and the first adding means; and
a third select means providing a carry signal or the sign bit of the first input data to the second adding means.

19. The digital data comparator according to claim 18, wherein the first and second selective data inverting means comprise a plurality of exclusive OR gate inputted the sign bit of the first input data to one input thereof, and inputted each bit of the first input data to another input thereof.

20. The digital data comparator according to claim 18, wherein the first adding means comprises a plurality of half-adder.

21. The digital data comparator according to claim 18, wherein the second adding means comprises a plurality of full-adder.

22. The digital data comparator according to claim 18, wherein the second adding means is comprised in an arithmetic logic unit.

23. The digital data comparator according to claim 18, wherein the first select means and the second select means comprise AND gate.

24. The digital data comparator according to claim 18, wherein the third select means comprises a multiplexer.

25. A microprocessor comprising:
a first selective data inverting means inverting a first input data when the sign of the first input data is negative, or outputting the first input data when the sign is positive;
a first adding means coupled to an output of the first selective data inverting means, adding one to the least significant bit when the sign of the first input data is negative, or outputting the first input data when the sign is negative;
a second selective data inverting means inverting a second input data when the sign of the second input data is positive, or outputting the second input data when the sign is negative; and
an arithmetic logic unit having an adding means including a carry signal input terminal, adding an output of the first adding means and an output of the second selective data inverting means.

26. A microprocessor comprising:
a first selective data inverting means inverting a first input data when the sign of the first input data is negative, or outputting the first input data when the code is positive;
a second selective data inverting means inverting a second input data when the sign of the second input data is positive, or outputting the second input data when the code is negative;
a first adding means coupled to an output of the second selective data inverting means, adding one to the least significant bit when the sign of the second input data is positive, or outputting the second input data when the sign is negative; and
an arithmetic logic unit having an adding means including a carry signal input terminal, adding an output of the first adding means and an output of the first selective data inverting means.

* * * * *

UNITED STATES PATENT AND TRADEMARK OFFICE
CERTIFICATE OF CORRECTION

PATENT NO.: 5,957,996
DATED: September 28, 1999
INVENTOR: Mikio SHIRAISHI

It is certified that errors appear in the above-identified patent and that said Letters Patent is hereby corrected as shown below:

In Claim 1, column 10, line 18, delete "or" and insert --of--.

In Claim 10, column 10, line 65, delete "date" and insert --data--.

Signed and Sealed this

Fifteenth Day of August, 2000

Attest:

Q. TODD DICKINSON

*Attesting Officer*    *Director of Patents and Trademarks*